US006173080B1

United States Patent
Cho et al.

(10) Patent No.: US 6,173,080 B1
(45) Date of Patent: *Jan. 9, 2001

(54) PREDICTION METHOD FOR DISCRETE COSINE TRANSFORM COEFFICIENT

(75) Inventors: Dae-sung Cho; Shi-hwa Lee; Jae-seob Shin, all of Seoul (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/933,988

(22) Filed: Sep. 19, 1997

(30) Foreign Application Priority Data

Sep. 21, 1996 (KR) ................................. 96-41503

(51) Int. Cl.[7] ....................................... G06K 9/36
(52) U.S. Cl. ......................... 382/250; 382/233; 382/238; 382/251
(58) Field of Search ................................. 382/238, 232, 382/233, 235, 239, 244, 245, 246, 248, 250, 251, 276; 358/335, 136, 403; 341/50, 67; 348/388, 416, 400, 426, 412

(56) References Cited

U.S. PATENT DOCUMENTS

| 5,001,559 | * | 3/1991 | Gonzales et al. | 358/133 |
|---|---|---|---|---|
| 5,073,820 | * | 12/1991 | Nakagawa et al. | 358/133 |
| 5,227,878 | * | 7/1993 | Puri et al. | 358/136 |
| 5,337,049 | * | 8/1994 | Shimoda | 341/50 |
| 5,416,615 | * | 5/1995 | Shirota | 358/530 |
| 5,502,571 | * | 3/1996 | Decotignie et al. | 358/335 |
| 5,528,299 | * | 6/1996 | Dufour et al. | 348/412 |
| 5,565,921 | * | 10/1996 | Sasaki et al. | 348/409 |
| 5,565,992 | * | 10/1996 | Enari | 358/261.3 |
| 5,623,312 | * | 4/1997 | Yan et al. | 348/416 |
| 5,631,644 | * | 5/1997 | Katata et al. | 341/67 |
| 5,721,544 | * | 2/1998 | Suzuki | 341/50 |
| 5,754,696 | * | 5/1998 | Miyashita et al. | 382/232 |
| 5,774,594 | * | 6/1998 | Kitamura | 382/239 |
| 5,822,462 | * | 10/1998 | Miyake | 382/251 |
| 5,841,477 | * | 11/1998 | Kim | 348/420 |

* cited by examiner

Primary Examiner—Bhavesh Mehta
Assistant Examiner—Kanji Patel
(74) Attorney, Agent, or Firm—Burns, Doane, Swecker & Mathis, L.L.P.

(57) ABSTRACT

A discrete cosine transform (DCT) coefficient prediction method and a DCT coefficient encoding method are provided. For the prediction of AC coefficients, location information of the nonzero AC coefficients is used. Then, the AC coefficients are divided into the vertical and horizontal component areas, and a remaining area, and variable modified zigzag scanning is applied for encoding. The performance of the AC coefficient prediction coding is improved as the absolute values of the predicted coefficients are small, and as the number of coefficients of value zero increases. The coefficients of value zero may be predicted as nonzero, so these coefficients are eliminated from the prediction. On the other hand, when using the characteristics of the adjacent blocks in a spatial domain, a larger weighted value is applied to the pixel values which are the nearest to the current block, thereby improving the prediction characteristics for DC/AC coefficients in a discrete cosine transform (DCT) domain.

6 Claims, 6 Drawing Sheets

PREDICTION METHOD FOR DISCRETE COSINE TRANSFORM COEFFICIENT

BACKGROUND OF THE INVENTION

The present invention relates to a video signal encoding/decoding method, and more particularly, to a prediction method for a discrete cosine transform coefficient, for predicting DC/AC coefficients of a current block using location information of nonzero AC coefficients in a discrete cosine transform (DCT) domain.

A discrete cosine encoder encodes without loss of DC/AC coefficients obtained after quantization. Here, the DC/AC coefficients of the current block are predicted using the fact that adjacent blocks are similar to each other.

FIG. 1 is a diagram illustrating a general DC/AC coefficient prediction method. In order to predict the coefficients of the current block 101 which has been quantized after the DCT, coefficients of adjacent blocks 102 and 103 which are obtained through the same process are used. DC coefficient 104 of the current block 101 is predicted using the DC coefficient 107 of an upper block 102 or the DC coefficient 109 of a left block 103. This is applied only for the prediction of the DC coefficient. An AC coefficient area 105 having the vertical characteristics of the current block 101 to be coded is predicted from the AC coefficients of an area 108 of the upper block 102. This prediction method is profitable when the vertical components between blocks of an image are similar. An AC coefficient area 106 having the horizontal characteristics is predicted from the AC coefficients of an area 110 of the left block 103. This prediction method is profitable when the horizontal components between blocks of the image are similar. The prediction of the DC/AC coefficients of the current block 101 is performed in the areas 104, 105 and 106.

FIG. 2 illustrates a general lossless encoding method of quantized coeficients in a DCT coding. In the block, a run-length coding is performed by zigzag scanning 201.

FIG. 3 shows the structure of an encoder/decoder of DCT coefficients using a general DC/AC coefficient prediction method. Data 301 is converted into a DCT coefficient 303 by a discrete cosine transformer (DCT) 302. The DCT coefficient 303 is quantized by a quantizer 304. A quantized DCT coefficient 305 is input to a DC/AC coefficient predictor 306 for the prediction. Predicted coefficient 307 is encoded by a variable length code (VLC) encoder 308 and output as a bit stream 309. The bit stream 309 is decoded by a VLC decoder 310. Decoded coefficient 311 is compensated by a DC/AC coefficient compensator 312, resulting in a compensated quantized coefficient 313. The compensated quantized coefficient 313 is inversely quantized by an inverse quantizer 314, and the obtained DCT coefficient 315 is inversely transformed by an inverse DCT (IDCT) 316, resulting in final restored data 317.

As described above, according to the general DC/AC coefficient prediction method, DC and AC coefficients in a horizontal or vertical area are predicted from the corresponding area of an adjacent block as shown in FIG. 1. When performing a DCT on a block, a DC coefficient corresponds to the brightness of the block, which is similar among adjacent blocks. Also, in the case of the AC coefficient, the vertical and horizontal components of the block are reflected in AC coefficients in a DCT domain, so that the prediction can be achieved if the vertical and horizontal components of each adjacent block have similarity.

However, the general DC/AC coefficient prediction method uses the results of the DCT of the adjacent blocks regardless of their value, so that the improvement in the prediction performance is less than optimum. Also, when predicting an AC coefficient having a value of zero, there is a high probability that the predicted AC coefficient is not equal to zero, thus the prediction performance can not improve. A new algorithm is required for solving these problems.

SUMMARY OF THE INVENTION

To solve the above problem, it is an object of the present invention to provide a discrete cosine transform (DCT) coefficient prediction method for predicting DC/AC coefficients using location information of nonzero AC coefficients in a DCT domain.

It is another object of the present invention to provide a method for encoding DCT coefficient using the DCT coefficient prediction method.

It is still another object of the present invention to provide a DCT coefficient prediction method for predicting AC coefficients using projected values of adjacent blocks or weighted values.

To achieve the first object of the present invention, there is provided a discrete cosine transform (DCT) coefficient prediction method comprising the steps of:

scanning a vertical or horizontal component area of quantized AC coefficients in a DCT domain to obtain location information of all nonzero AC coefficients of a current block; and predicting a DC coefficient and all nonzero AC coefficients in the vertical or horizontal component area, of the current block, using the location information and quantized DC and AC coefficients of the adjacent blocks.

To achieve the second object of the present invention, there is provided a discrete cosine transform (DCT) coefficient encoding method comprising the steps of:

scanning a vertical or horizontal component area of quantized AC coefficients in a DCT domain to obtain location information of all nonzero AC coefficients of a current block;

predicting a DC coefficient, and all nonzero AC coefficients in the vertical or horizontal component area, of the current block, using the location information and quantized DC and AC coefficients of the adjacent blocks; and encoding the absolute difference between the DC coefficient of the current block and those of the adjacent blocks, and the absolute differences between the nonzero AC coefficients in the vertical or horizontal area of the current block, and those of the adjacent blocks, using the location information and the prediction coefficients, and applying a modified zigzag scanning to the remaining non-predicted AC coefficients for encoding.

According to an aspect of the third object, there is provided a discrete cosine transform (DCT) coefficient prediction method comprising the steps of:

(a) projecting pixel data, which are the closest to a current block in a spatial domain, in the horizontal or vertical direction; and (b) performing DCT and quantization on the pixel data projected in the horizontal or vertical direction, and predicting DC and AC coefficients of the current block using the quantized DC and AC coefficients of the adjacent blocks, in a DCT domain.

According to another aspect of the third object, there is provided a discrete cosine transform (DCT) coefficient prediction method comprising the steps of:

(a) applying weighted values to pixel data of blocks adjacent to a current block in a spatial domain, wherein a smaller weight is applied to pixel values which are further from the current block; and (b) performing DCT and quantization on the pixel data of the adjacent blocks to which the weighted values are applied, and predicting DC and AC coefficients of the current block using the quantized DC and AC coefficients of the adjacent blocks, in a DCT domain.

According to the present invention, the location information of the vertical and horizontal components of the AC coefficients is used for predicting AC coefficients. Here, the vertical and horizontal component areas of the AC coefficients, and the remaining coefficient area, are separately coded by using variable modified zigzag scanning. The performance of the AC coefficient prediction encoding is improved as the absolute values of the predicted coefficients are small, and as the number of coefficients of value zero increases. That is, because the AC coefficients in the vertical and horizontal component areas which are equal to 0 may be predicted to be nonzero, those AC coefficients of zero are excluded from the prediction.

In order to strengthen DC/AC coefficient prediction characteristics in the DCT domain, a large weighted value is applied to the pixel values nearer to the current block, when using the characteristics of the adjacent blocks in a spatial domain. Here, in the spatial domain, when the weights are assigned such that only the pixels nearest to the current block is considered, that provides the same result as when the value of that nearest pixel is projected over the adjacent block.

The DCT coefficient prediction method according to the present invention is effectively applied to a general moving picture encoding algorithm.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
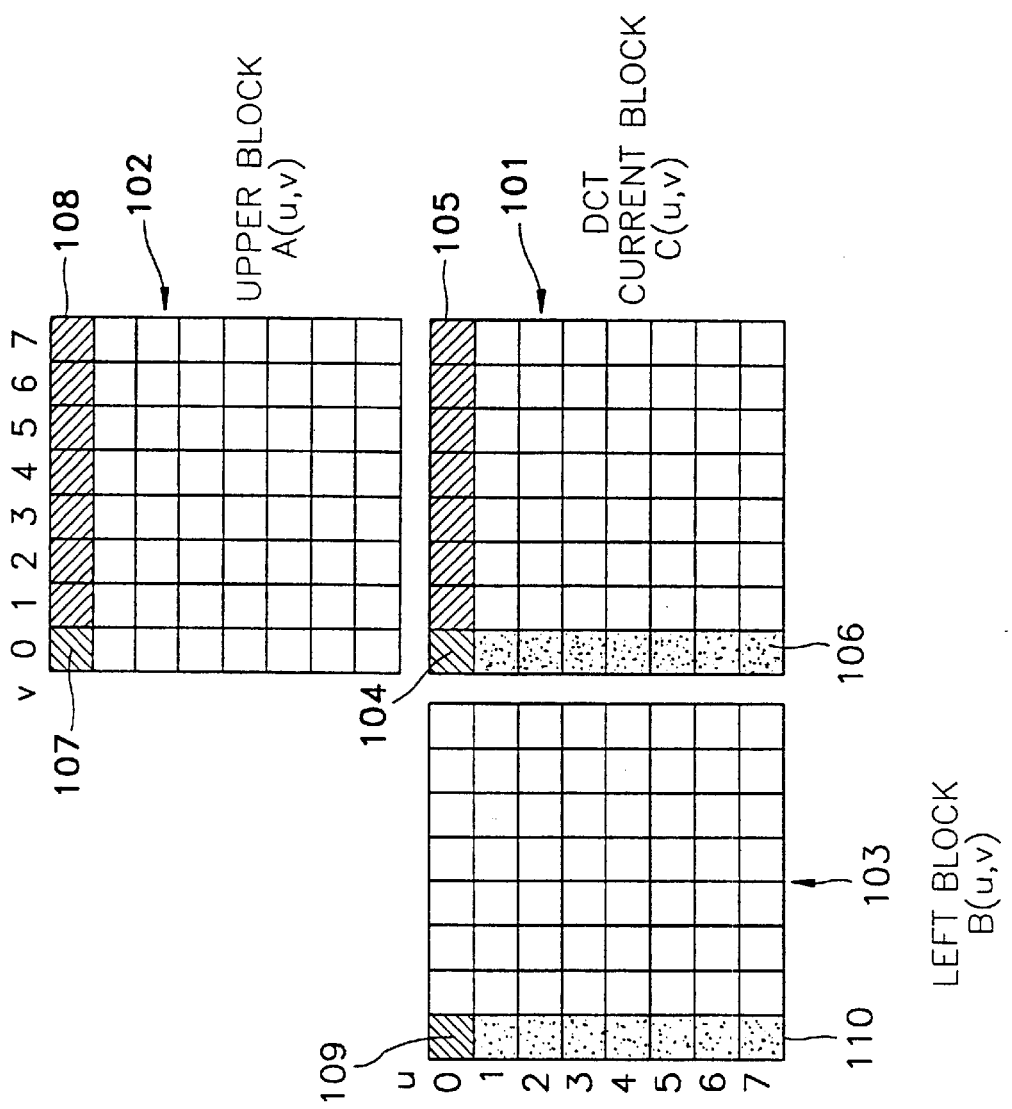
FIG. 1 is a diagram illustrating a general prediction method for DC/AC coefficients in a discrete cosine transform (DCT) domain.
Figure 3:
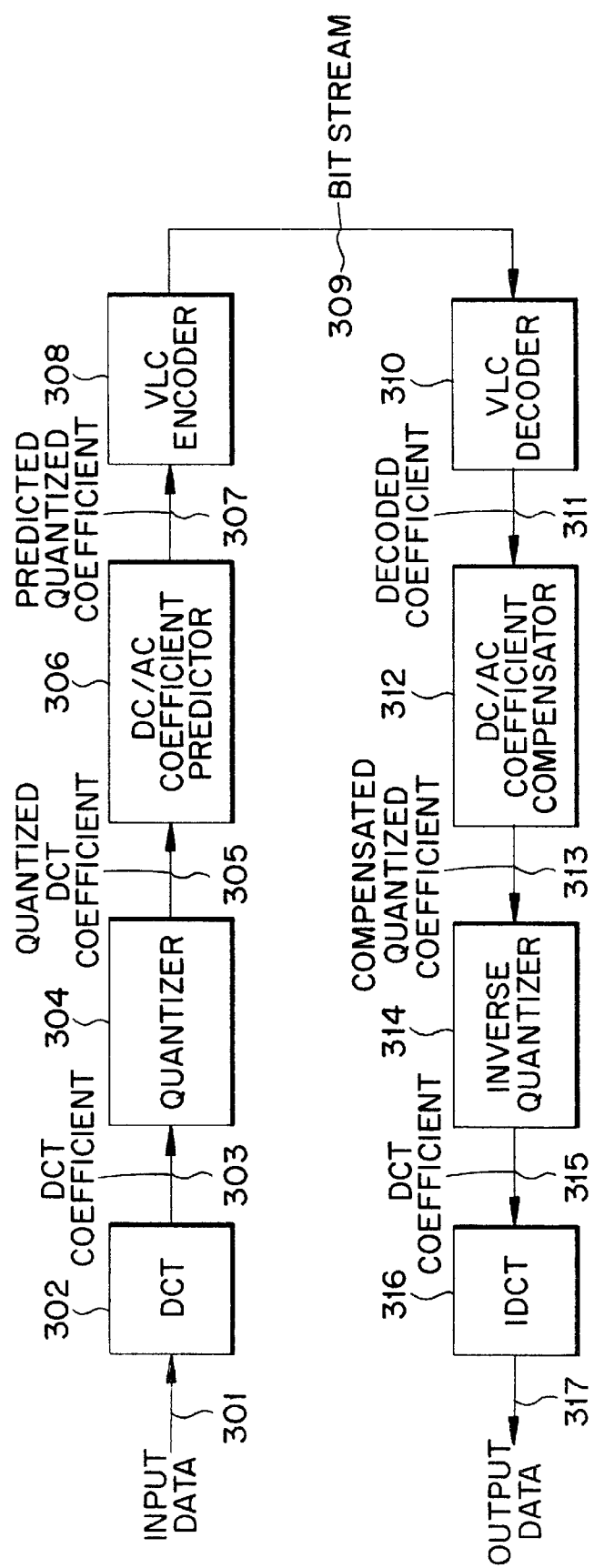
FIG. 3 is a diagram showing an encoder/decoder of DCT coefficients using the DC/AC coefficient prediction in the DCT domain.
Figure 4:
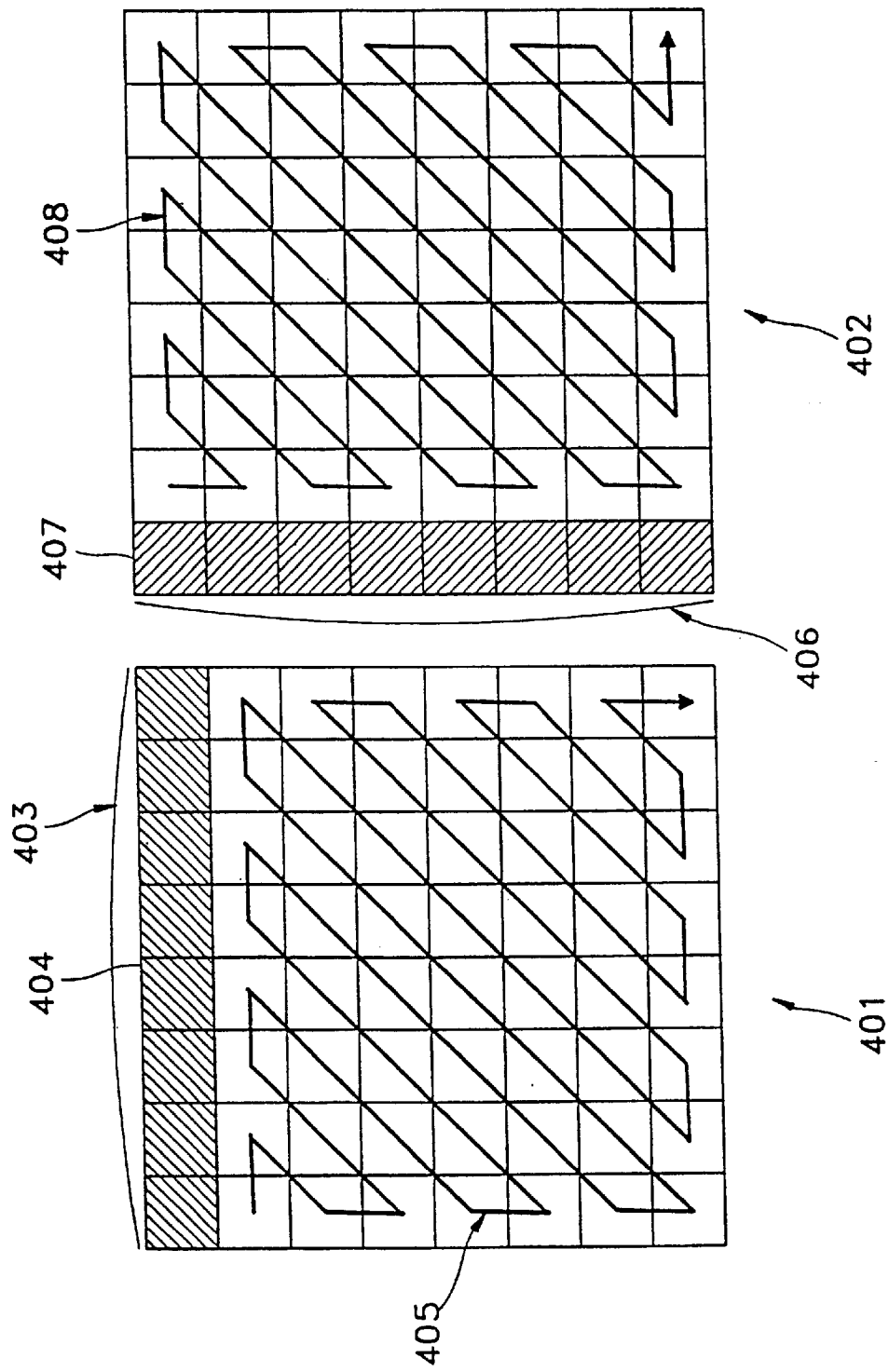
FIG. 4 is a diagram illustrating a DCT coefficient prediction method for predicting nonzero AC coefficients, and a DCT coefficient encoding method, according to the present invention.

According to the present invention, in order to perform the general DC/AC coefficient prediction method of FIG. 1 but only on nonzero AC coefficients, AC coefficients of the current block are divided into vertical and horizontal areas, and a remaining area, to provide variable modified zigzag scanning structures shown in FIG. 4. This is applied to the DC/AC coefficient predictor 306, variable length code (VLC) encoder 308, VLC decoder 310 and DC/AC coefficient compensator 312 of the encoder/decoder of FIG. 3. Particularly, the prediction values of the adjacent blocks are obtained using the projected values of FIG. 5 or using weighted values.

FIG. 4 illustrates a DCT coefficient prediction method for predicting only nonzero AC coefficients, and a DCT coefficient encoding method according to the present invention. The zigzag scanning of block 401 is an encoding method used when making the prediction based on the block 102 of FIG. 1. In the block 401, representing the current block, only AC coefficient area 403 is predicted using the coefficients of the area 108 of FIG. 1. Here, scanning in the horizontal direction 404 is previously performed to provide to the encoder location information of the nonzero coefficients. In this case, the level values of the coefficients which are not equal to 0, for a general last-run-level coding, are predicted from the coefficients of the area 108, and the level values may be equal to 0. The AC values which are not located in the area 403 are run-length-coded by the modified zigzag scanning.

A block 402 is encoded in the same manner as the above. In this case, for predicting coefficients of the area 406, the coefficients of the area 110 of the block 103 of FIG. 1 are used. Location information of coefficients which are not equal to 0 is provided to the encoder through vertical scanning 407. Here, the levels of the prediction values are predicted from the AC coefficients of the area 110 of FIG. 1.

Figure 5:
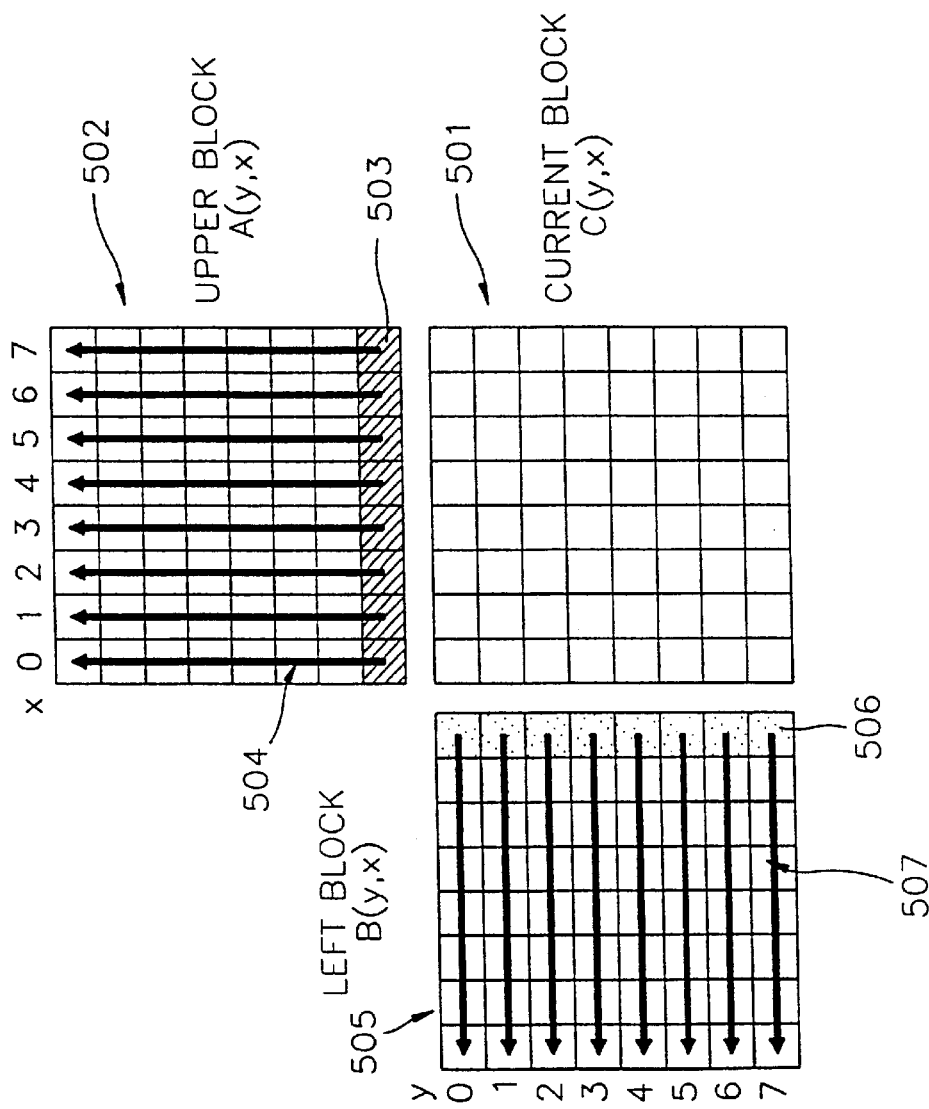
FIG. 5 is a diagram illustrating a DCT prediction method using projected values in vertical/horizontal directions of pixel data of adjacent blocks in a spatial domain, or weighted values.

FIG. 5 illustrates a prediction method using projected values of the adjacent blocks or using weighted values. The data of a block 501, and the data 301 to be input to the DCT 302 of FIG. 3, are both in the spatial domain. If vertically projected values of an upper block 502 in the spatial domain pass through the DCT 302 and the quantizer 304 of FIG. 3, the block 102 of FIG. 1 is obtained. In the same method as above, if horizontally projected values of a left block 505 in the spatial domain pass through the DCT 302 and the quantizer 304 of FIG. 3, the block 103 of FIG. 1 is obtained. In the spatial domain, the pixels which are closest to the current block 501 in a vertical direction correspond to the area 503 of the block 502. These values are projected in the vertical direction 504, or weighed values are applied. Here, smaller weighted values are applied to pixels further away (in the direction 504) from the area 503. Then, DCT and quantization are performed before a prediction. In the same manner as above, in the special domain, the pixels which are the closest to the block 501 in a horizontal direction correspond to the area 506 of the left block 505. These values are projected in the horizontal direction 507, or weighted values are applied. Here, smaller weighted values are applied to pixels further away (in the direction 507) from the area 506. Then, DCT and quantization are performed before the prediction.

Figure 2:
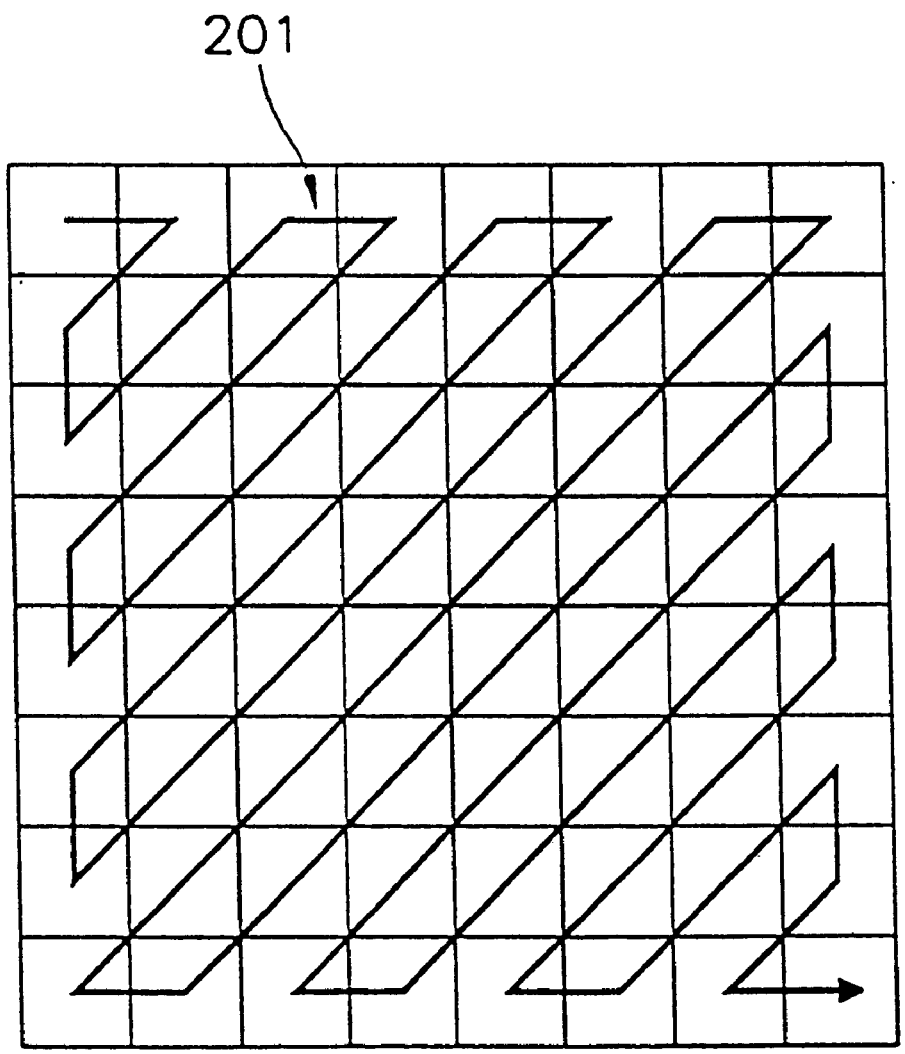
FIG. 2 is a diagram illustrating a general encoding method using a zigzag scanning in the DCT domain.
Figure 6:
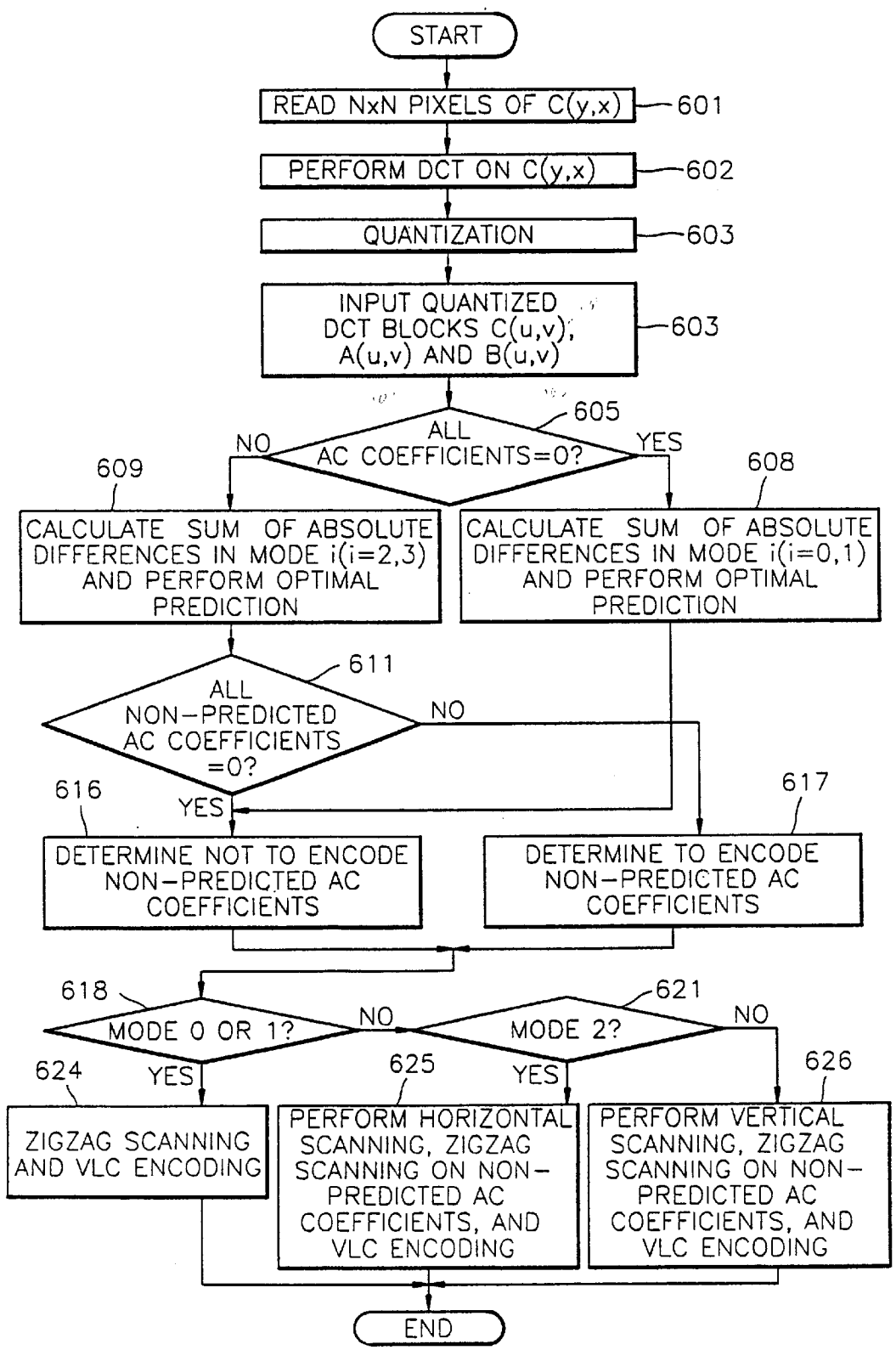
FIG. 6 is a flowchart illustrating a DCT coefficient encoding method using the DCT coefficient prediction method according to the present invention.

FIG. 6 is a flowchart illustrating an encoding method using the DC/AC prediction. In step 601, an N×N pixel block is selected, usually an 8×8 unit. Then, DCT is performed (step 602), and quantization is performed on the DCT-blocks (step 603). In step 604, the current quantized DCT block C(u,v) and the quantized DCT blocks A(u,v) and B(u,v) corresponding to the previously stored blocks 102 and 103 of FIG. 1 are input for prediction. Then, it is determined in step 605 whether all AC coefficients are equal to 0 or not. If all AC coefficients are equal to 0, only a DC coefficient is predicted (modes 0 and 1) since the encoding of the AC coefficients is unnecessary (step 608). Here, mode 0 represents the case where the DC coefficient is predicted from the DC coefficient 107 of the upper block 102 of FIG. 1, and mode 1 represents the case where the DC coefficient is predicted from the DC coefficient 109 of the left block 103 of FIG. 1. If all AC coefficients are not equal to 0 in step 605, AC coefficients are predicted as well as DC coefficients (modes, 2, 3) (step 609). Here, mode 2 represents the case where the DC/AC coefficients are predicted from the upper block 102 of FIG. 1, and mode 3 represents the case where the DC/AC coefficients are predicted from the left block 103 of FIG. 1. Also, in steps 608 and 609, the sum of the absolute differences between the current block coefficients and the predicted coefficients according to each mode are calculated, and optimal prediction is performed after selecting the prediction mode having the smallest total absolute difference. After step 609, it is determined whether non-predicted AC coefficients of the area other than the areas 104 and 105 of the block 101 of FIG. 1 (in the case of mode 2) or the area other than the areas 104 and 106 of the block 101 (in the case of mode 3) are equal to 0 or not (step 611), in order to determine whether to encode the non-predicted AC coefficients (step 617) or not (step 616). If the prediction mode is mode 0 or mode 1 (for DC coefficient prediction), VLC coding for DC/AC coefficient is performed using zigzag scanning (step 624) as shown in FIG. 2. If the prediction mode is mode 2 (step 621), the horizontal scanning on the predicted AC coefficients and modified zigzag scanning on the non-predicted AC coefficients, as shown on the block 401 of FIG. 4, are performed for the VLC encoding. If the prediction mode is mode 3, the vertical scanning on the predicted AC coefficients and the modified zigzag scanning on the non-predicted AC coefficients, as shown on the block 402 of FIG. 4, are performed for the VLC encoding.

As described above, in the DCT coefficient prediction method according to the present invention, only nonzero AC coefficients are predicted, and the projected values from the adjacent blocks are used, thereby improving performance in the prediction of DC/AC coefficients.

What is claimed is:

1. A discrete cosine transform (DCT) coefficient prediction and encoding method, comprising the steps of:
   (a) dividing a block of coefficients, representing image pixels in a DCT domain, into two regions, a predicted region including a vertical or a horizontal component area, and a non-predicted remaining region for which coefficients are not predicted;
   (b) scanning said vertical or horizontal component area of quantized AC coefficients in the DCT domain to obtain location information of a current block, which indicates whether AC coefficients are zero or not;
   (c) excluding, from prediction of a DC coefficient and AC coefficients of the current block from quantized DC and AC coefficients of adjacent blocks in the predicted region of the current block, all zero AC coefficients in said current block based on said location information;
   (d) predicting a DC coefficient and only non-zero AC coefficients of the current block from quantized DC and AC coefficients of the adjacent blocks in the predicted region of the current block; and
   (e) encoding the absolute difference between the DC coefficient of the current block and those of the adjacent blocks, and the absolute differences between the non-zero AC coefficients in the vertical or horizontal area of the current block, and those of the adjacent blocks, using the location information and the prediction coefficients, and applying a zig-zag scanning to the remaining non-predicted AC coefficients for encoding.

2. A discrete cosine transform (DCT) coefficient prediction method, comprising the steps of:
   (a) obtaining neighboring blocks of pixel data, which are projected from the closest pixels of a current block of pixel data in a spatial domain, in a horizontal or vertical direction;
   (b) performing DCT and quantization on the pixel data of the neighboring blocks projected in the horizontal or vertical direction; and
   (c) predicting DC and AC coefficients of the current block of pixel data from the quantized DC and AC coefficients of the neighboring projected blocks of pixel data in a DCT domain.

3. A discrete cosine transform (DCT) coefficient prediction, comprising the steps of:
   (a) obtaining neighboring blocks of pixel data, to which weighting values are applied to pixel data of blocks adjacent to a current block of pixel data in a spatial domain, wherein smaller weights are applied to pixel values which are further from the current block;
   (b) performing DCT and quantization on the pixel data of the neighboring blocks weighted in the horizontal or vertical direction; and
   (c) predicting DC and AC coefficients of the current block from the quantized DC and AC coefficients of the adjacent blocks in a DCT domain.

4. A method for performing a prediction routine for the purpose of encoding data, comprising:
   (a) selecting a block of pixels of an image to encode;
   (b) performing discrete transformation and quantization to said block of pixels to form a quantized DCT data block;
   (c) determining whether all AC coefficients of said quantized DCT block are equal to zero or not; and
   (d) if all AC coefficients are equal to zero, predicting only a DC coefficient for said quantized DCT data block; otherwise, predicting both AC and DC coefficients for said quantized DCT data block in said prediction routine.

5. The method of claim 4, wherein said determining step performed in said prediction routine further comprises determining the sum of absolute differences between the current block's coefficients and the predicted coefficients.

6. The method of claim 4, further comprising the step of performing encoding of said DC coefficient or of both AC and DC coefficients by employing a zig-zag scan on the remaining non-predicted AC coefficients which have not been predicted.

* * * * *